United States Patent Office 3,715,340
Patented Feb. 6, 1973

3,715,340
PROCESS FOR PREPARING POLYAMIDES
Arnold B. Finestone, Woodcliff Lake, N.J., and Willard M. Sims, Leominster, Mass., assignors to Foster Grant Co. Inc., Leominster, Mass.
No Drawing. Continuation-in-part of application Ser. No. 878,212, Nov. 19, 1969. This application Aug. 19, 1971, Ser. No. 173,328
Int. Cl. C08g 20/18
U.S. Cl. 260—78 L                    11 Claims

ABSTRACT OF THE DISCLOSURE

A method of preventing the formation of gel in polyamides prepared from aminocarboxylic acids or lactams comprising adding to the corresponding monomer prior to its polymerization about 0.025 to 0.5 mole, per 100 moles of monomer, of an alkyl ammonium aromatic acid salt or an alkylene bis ammonium aromatic acid salt.

BACKGROUND OF THE INVENTION

This application is a continuation-in-part of copending patent application, Ser. No. 878,212, filed Nov. 19, 1969, now abandoned.

This invention relates to the preparation of polyamides and, more particularly, to the preparation of polyamide compositions having a very low gel content and improved whiteness.

The polyamide compositions improved in accordance with the present invention include all of the normally solid water insoluble polycarbonamides having recurring amide groups as integral parts of the polymer chain which are prepared from aminocarboxylic acids or lactams thereof containing about 4 to 12 carbon atoms between the amine and carboxyl groups. The term monomer is used to designate the reactant or mixture of reactants from which any of the above polyamides are made. Thus, the term includes lactams such as caprolactam and omega-amino acids such as amino-caproic acid, and mixtures of these monomers. The term aromatic acid is used generically herein and includes any monobasic carboxylic acid which contains, as part of its structure, a benzene or naphthalene ring and which is free of substituents which interfere with its performance as a molecular weight regulating agent and a gel inhibitor. Included in the term are aryl acids, such as benzoic and naphthoic acids, alkaryl acids such as the toluic acids and aralkyl acids such as phenyl acetic acid.

The above polyamides are generally prepared by heating an amide-producing monomeric reaction mixture to about 200 to 300° C. in the presence of a suitable catalyst and maintaining it at that temperature for about 12 to 36 hours. The monomeric reaction mixture may be comprised of one or more amino acids and/or lactams. Once the polymerization begins, the polyamide chains will continue to grow to a very high molecular weight provided the reaction mixture contains substantially equal amounts of acid and amine groups and provided that the reaction mixture is pure, i.e., provided it contains no substances which act as chain terminating agents. However, since it is usually desirable to limit the molecular weight of the polymer, molecular weight regulating agents are usually added to the polymerization mixture. These agents, commonly known as stabilizers, are usually compounds which contain a single functional group. Typically, monoacids such as acetic or benzoic acids, and amines such as butyl or hexyl amine are used to control the molecular weight of polyamides. Although monofunctional stabilizers do limit the size of growing polyamide chains, they also sometimes fail to prevent and may even promote crosslinking between adjacent polyamide chains because they upset the balance of carboxyl and amine groups. The phenomenon results in the formation of gels in the polymer which renders the product unsuitable for many operations such as film forming and molding, because the polymer, which is in the form of a melt in these operations, has a non-uniform consistency, i.e., it contains aggregates of gel. These gel aggregates produce blemishes such as lumps or streaks in films formed from the melt and when the polyamide is molded the gels clog the orifices of the molding machines and reduce the quality and appearance of the molded product.

It is known that gels can be substantially eliminated from polyamides by the use of stabilizers comprised of a substantially equal amount of monofunctional acid and amine molecules. A stabilizer of this type is the n-butyl ammonium salt of acetic acid. This salt dissociates into equal amounts of monoacid and monoamine containing compounds. Although n-butyl ammonium acetate performs well in regulating the molecular weight of polyamides without causing the formation of gels because it does not upset the balance of acid and amine groups in the reaction mixture, it has a tendency to yellow upon aging and often imparts an off-color to the polyamide product when it is added to the polymerization formulation. Hence, it cannot be satisfactorily used where color reproducibility is important. The use of monofunctional acids and amines and acid-amine salts as molecular weight regulators in the preparation of polycaprolactam is discussed in the article "Regulators for the molecular weight of polycaprolactams, and their mechanism of influence" by N. D. Katorznov et al. Khimichiskie Volokna 1964, No. 6, pp. 23–26.

A method has now been discovered for preparing polyamides which are free from the above noted deficiencies. Polyamides can now be prepared having any desired molecular weight and which are entirely or substantially gel-free. Furthermore the color of these polyamides is not adversely affected by the stabilizers used to regulate the molecular weight of the polymers and, in fact, it is even brighter than when no stabilizer is used. Accordingly, it is an object of the present invention to present polyamide compositions prepared from amino acids or lactams having a very low gel content and excellent whiteness. It is another object of the invention to present a process for preparing polyamide compositions of any desired molecular weight and little or no gel without affecting the whiteness of the product. These and other objects of the present invention will become apparent as the description proceeds.

SUMMARY OF THE INVENTION

According to the present invention, one or more aminocarboxylic acids or lactams thereof containing about 4 to 12 carbon atoms between the amine and carboxyl groups are polymerized by batch or continuous methods in the presence of about 0.025 to 0.5 molar equivalent, per 100 moles of monomer charge, of a salt having one of the following general formulas:

(A)         $R'COOH \cdot NH_2R$
(B)    $R'COOH \cdot NH_2R''' NH_2 \cdot HOOCR''$ where R is an alkyl radical preferably having 1 to 12 carbon atoms; R' and R'' are the same or different aromatic radicals selected from the group consisting of unsubstituted or alkyl substituted phenyl or naphthyl containing preferably up to two alkyl substituents, the total number of carbon atoms in the alkyl substituents preferably not exceeding 12; and R''' is an alkylene group having preferably 1 to 12 carbon atoms.

DESCRIPTION OF THE INVENTION

Applicant's invention provides an effective method for regulating the molecular weight of the present class of polyamides while at the same time substantially eliminating gel formation in them and improving their color. The invention can be practiced in either batch or continuous polymerization processes whenever it is desirable to regulate the molecular weight of the polyamides being produced. However, since molecular weight control is quite critical in continuous processes because an increase in molecular weight is accompanied by an increase in viscosity and as the viscosity increases it becomes increasingly more difficult to pump the polymerizing mass through the reactor, the invention is particularly beneficial in continuous processes. Furthermore, the problem of gel formation is more prevalent in continuous processes than in batch processes, particularly in continuous processes in which the polymer passes through a very low pressure stage prior to being discharged from the reactor since the conditions of very low pressure and high temperature are conducive to the formation of gels. Since conditions of low pressure and high temperature are generally encountered in the continuous polymerization of lactams, the invention will be described in detail as it applies to the continuous polymerization of lactams.

The polyamides improved in accordance with the invention are produced from amino acids or lactams which contain about 4–12 carbon atoms between the amine and the carboxylic acid groups in the chain. In other words, these polyamides will have about 4–12 carbon atoms between each repeating in-chain amide group. The monomers used may be either straight chain or branched chain compounds containing one or more small alkyl side chains. The preferred polyamides are those prepared from monomers containing up to a total of 12 carbon atoms. Examples of typical monomers included in this class of compounds are 6-amino caproic acid or the corresponding lactam, epsilon-caprolactam, and dodecalactam. The preferred monomer is epsilon-caprolactam.

In a typical process for the continuous preparation of polylactams, a reaction mixture containing a lactam, such as epsilon-caprolactam, and any other desired additives such as catalysts, lubricants, etc., is pumped into a reactor maintained at a temperature high enough to effect the opening of the lactam ring and the polymerization of the lactam. In the case of epsilon-caprolactam this temperature is about 250–300° C. The reaction mixture is maintained at this temperature until all of the lactam rings are opened. During this period the reaction mass proceeds slowly through the reactor, which is generally in the shape of an elongate heated tube. The reaction tube empties into a vacuum chamber in which the pressure is reduced to below atmospheric and usually to a few millimeters of mercury. The temperature in the vacuum chamber is maintained at about 250–300° C. Under these conditions unreacted monomer is rapidly vaporized from the reaction mixture and is quickly removed from the vacuum chamber by means of air ejectors which are connected to the upper end of the vacuum chamber. Unreacted monomeric vapors being removed from the vapor space in the vacuum chamber are condensed and recovered for recycle. The polylactam is discharged from the bottom of the vacuum chamber, usually through a series of spinnerettes, after which it is cooled and pelletized. Typical apparatus for the continuous polymerization of lactams is shown and described in U.S. Patent Nos. 2,735,839 and 2,735,840, issued to Shrink and Lynch, respectively.

According to a preferred embodiment of the invention a salt prepared from an aromatic acid and an alkyl amine or alkylene diamine is added to a monomeric reaction mixture prior to its treatment in accordance with the above procedure. The salts contemplated in the preferred embodiment have the following formulas:

(A) $\quad$ R'COOH·NH$_2$R where R is an alkyl-radical preferably having 1 to 12 and most preferably 3 to 6 carbon atoms and R' is an unsubstituted or an alkyl substituted phenyl radical or an unsubstituted or alkyl substituted naphthyl radical. The alkyl substituents in the phenyl and naphthyl radicals are preferably 1 or 2 in number and the alkyl side chains preferably contain a maximum of 12 carbon atoms. The alkyl side chains may be attached to any of the nuclear carbon atoms. Similarly, they may be at any of the open positions in the case of alkyl substituted naphthyl radicals. The amount of carbon atoms in each group may vary, but the maximum total number of carbon atoms in both alkyl groups preferably does not exceed 12. Although alkyl groups containing more than 12 carbon atoms are not excluded from the invention, the cost of preparing these compounds becomes increasingly more prohibitive as their complexity and size increases hence they are not as desirable as the lower alkyls. The carboxyl carbon which associates with the amine group to form the salt is preferably attached directly to any of the nuclear carbon atoms. Its position relative to the alkyl side chains does not materially affect the performance of the stabilizers. The preferred aromatic acids are benzoic, the toluic acids (ortho, meta or para-methyl benzoic acid) and naphthoic acid. The preferred alkyl amine is butylamine. The preferred salts of this group are butyl ammonium benzoate and butyl ammonium toluate.

(B) $\quad$ R'COOH·NH$_2$R'''NH$_2$·HOOCR'' where R' is a radical as defined above, R'' is an aromatic radical selected from the same group as R', and R' and R'' may be the same or different radicals, and R''' is an alkylene group, preferably containing 1 to 12 carbon atoms. The preferred alkylene group is hexamethylene and the preferred salt in this class is hexamethylene bis (ammonium benzoate).

Although the stabilizers described above in detail are preferred, it is contemplated that any alkyl ammonium aromatic acid or alkylene bis ammonium aromatic acid salt which is free from substituents which interfere with the proper functioning of the stabilizer can be used in the invention.

The above salts can be prepared by any conventional method and their preparation forms no part of the present invention. In a typical process for preparing the salts the acid is dissolved in an inert organic solvent such as a lower alcohol, and the amine or diamine is added dropwise to the acid solution. An excess of the amine can be added to ensure that all of the acid is reacted. After allowing time for the complete reaction of the acid and amine, the salt is separated from the solvent and unreacted amine by physical methods, such as crystallization.

The amount of salt added to the polymerization mixture can vary depending on the particular salt being added and the amount of gel which can be tolerated in the product. In general it has been found that about 0.025 to 0.50 equivalent of salt per 100 moles of monomer produces satisfactory results. Greater or lesser quantities of the salts can be added to the reaction mixture; however, it has been found that the best results are obtained when the salt concentration is in the above range. The beneficial effect obtained diminishes rapidly as the amount is increased beyond about 0.50 equivalent of the salt per 100 moles of monomer. The term "equivalent" as used in the present discussion has its usual meaning, i.e., the weight in units of a molecule that will replace one unit of hydrogen. In the case of monofunctional salts, i.e., salts containing one acid group and one amine group per molecule of salt, the equivalent weight is the same as the molecular weight whereas in the case of a salt which contains two acid and two amine groups per molecule the equivalent weight is one-half of the molecular weight. Thus, if in a particular polymerization it requires 0.5 mole of n-butyl ammonium benzoate per 100 moles of monomer present to prevent gel formation, it would only require 0.25 mole of hexamethylene bis (ammonium benzoate) to accomplish the same result.

Other components may be added to the reaction mixture prior to or during the polymerization. For instance, catalysts, such as water or amine acids, are usually added to the polymerization mixtures in a concentration of about 0.1 to 0.2% by weight. Other substances such as lubricants, etc., may similarly be added. Furthermore, materials such as dyes, fillers, and external lubricants may be post-blended into the product either before or after the polyamide leaves the spinnerettes.

The invention is further illustrated by the following examples in which the percentages of the ingredients, where expressed, are based on the weight of monomer.

Example 1

About 300 ml. of methanol are added to a 500 ml. agitated flask which has been swept with nitrogen and maintained under a nitrogen blanket. About 1 mole of benzoic acid is added to the flask and stirred until the benzoic acid is dissolved in the methanol. The flask is then placed in an ice bath and about 1.1 moles of n-butylamine are added dropwise to the benzoic acid solution, care being taken to ensure that the temperature does not exceed about 40° C. After the reaction is completed, the methanol is separated from the product by evaporation. The residue is washed in water to remove excess n-butylamine and recovered by crystallization. The product is a white crystalline salt having a melting point of about 80° C.

The apparatus in which the experiments are carried out is a typical continuous tube reactor maintained at a temperature of about 250° C. equipped at its discharge end with a vacuum chamber which is maintained at about 250° C. and which is in the shape of a cylindrical vessel having a conical bottom section emptying into a screw conveyor attached to a battery of spinnerettes, and a top section equipped with a vent line leading to a series of air ejectors and condensers. The air ejectors are set to maintain an absolute pressure in the vacuum chamber of about 2 mm. of mercury. The polyactam being discharged from the vessel passes through the spinnerettes, is cooled in a water bath and is pelletized.

A mixture comprised of a molten epsilon-caprolactam which has been maintained under a nitrogen blanket, about 0.05 mole per 100 moles of epsilon-caprolactam of the above prepared n-butyl ammonium benzoate and 0.1% water based on the weight of epsilon-caprolactam, is continuously passed through the above described reactor at a rate that provides a reactor residence time of about twenty-four hours. The pelletized product obtained is molded into films which are evaluated for gel and whiteness. The product contains only a trace of gel and has a very white color.

Example 2

The procedure of Example 1 is repeated except that 0.05 mole of n-butyl ammonium p-toluate is substituted for the n-butyl ammonium benzoate. The resulting product has a very white color and contains very few gels.

Example 3

The procedure of Example 1 is repeated except that 0.05 mole of n-butyl ammonium 2-naphthoate is substituted for the n-butyl ammonium benzoate. The product obtained has a very white color and films formed from the product are found to contain very few gels.

Example 4

The procedure of Example 1 is repeated except that 0.025 mole of hexamethylene bis (ammonium benzoate) is substituted for the n-butyl ammonium benzoate. A white product is obtained and films molded from the product contain very few gels.

Example 5 (Comparative)

Example 1 is repeated except that 0.05 mole of n-butyl ammonium acetate is substituted for the n-butyl ammonium benzoate. The product obtained has a slightly off-white color and when molded contains very few gels.

Although the invention is illustrated by specific examples in which polycaprolactam is prepared, it is understood that the scope of the invention is not limited thereto but is determined only by the breadth of the appended claims, and that other embodiments within the spirit of the invention, not specifically illustrated, are within the scope of the invention. For example, the invention can be used in the batch polymerization of polycaprolactam and also in the batch or continuous polymerization of other lactams and amino acids when it is desired to prevent or reduce gel formation.

We claim:

1. A method of reducing gel formation in film-forming polyamides by polymerizing at least one aminocarboxylic acid or lactam thereof having about 4 to 12 carbon atoms between the amine and carboxyl groups in the presence of about 0.025 to 0.5 equivalent per 100 moles of monomer of a salt selected from the group consisting of compounds of the formula:

$R'COOH \cdot NH_2R$ and $R'COOH \cdot NH_2R''' NH_2 \cdot HOOCR''$ wherein R is an alkyl radical; R' and R'' are the same or different aromatic radicals selected from the group consisting of phenyl, alkyl substituted phenyl containing 1 to 2 alkyl substitutents, naphthyl, and alkyl substituted naphthyl containing 1 to 2 alkyl substituents; R''' is an alkylene group containing 1 to 12 carbon atoms.

2. A method of reducing gel formation in film-forming polyamides by polymerizing one or more omega-aminocarboxylic acids or corresponding lactam containing about 4 to 12 carbon atoms between each repeating in chain amide group in the presence of about 0.025 to 0.5 equivalents per 100 moles of monomer of a salt selected from the group consisting of compounds of the formula:

$R'COOH \cdot NH_2R$ and $R'COOH \cdot NH_2R''' NH_2 \cdot HOOCR''$ wherein R is an alkyl radical; R' and R'' are the same or different aromatic radicals selected from the group consisting of phenyl, alkyl substituted phenyl containing 1 to 2 alkyl substituents, naphthyl, and alkyl substituted naphthyl containing 1 to 2 alkyl substituents; and R''' is an alkylene group containing 1 to 12 carbon atoms.

3. A process according to claim 2 wherein the maximum total number of carbon atoms in the alkyl substituents is 12 and the maximum number of carbon atoms in the alkylene group is 12.

4. A process according to claim 3 wherein the monomer is epsilon-caprolactam.

5. A process according to claim 4 wherein the polymerization is by the continuous method.

6. A process according to claim 4 wherein the salt is selected from the group consisting of butyl ammonium benzoate, butyl ammonium toluate, butyl ammonium naphthoate, and hexamethylene bis (ammonium benzoate).

7. A continuous process for preparing substantially gel free polyamide comprising reacting a monomer comprised of at least one amino acid or lactam containing about 4 to 12 carbon atoms in the presence of about 0.025 to 0.50 equivalent per 100 moles of monomer of a salt selected from the group consisting of n-butyl ammonium benzoate, n-butyl ammonium p-toluate, and hexamethylene bis (ammonium benzoate) at a temperature sufficiently high to effect polymerization until at least about 90% of the monomer is converted to polymer.

8. A process according to claim 7 wherein the reaction is carried out in a continuous tube reactor at a temperature of about 250 to 350° C.

9. A process according to claim 8 wherein the reaction mass passes through a vacuum chamber prior to being discharged from the reactor, the absolute pressure in the vacuum chamber being 0.1 to 10.0 millimeters.

10. A process according to claim 9 wherein the monomer is epsilon-caprolactam.

11. In a process for the continuous manufacture of polylactam which comprises passing a molten reaction mixture, comprised of a lactam containing about 4 to 12 carbon atoms, through a first reaction zone maintained at a temperature sufficiently high to open the rings of the lactam and polymerize the lactam at such a rate that the desired degree of polymerization is effected, then passing the lactam reaction mixture through a second reaction zone maintained at a pressure low enough to permit the vaporization of unreacted monomer from the reaction mixture at such a rate that the monomer content of the reaction mixture is reduced to less than about 10%, then continuously discharging the finished polymer from the reactor, the improvement comprising adding to the lactam reaction mixture, prior to the polymerization, about 0.025 to 0.5 equivalents, per 100 moles of lactam, of a salt selected from the group consisting of compounds of the formulas:

$R'COOH \cdot NH_2R$ and $R'COOH \cdot NH_2R''' \cdot NH_2 \cdot HOOCR''$ wherein R is an alkyl radical having 1 to 12 carbon atoms; R' and R'' are the same or different aromatic radicals selected from the group consisting of phenyl, alkyl substituted phenyl containing 1 to 2 alkyl substituents, the total number of alkyl carbon atoms not exceeding 12, naphthyl, and alkyl substituted naphthyl containing 1 to 2 alkyl substituents, the total number of alkyl carbon atoms not exceeding 12; and R''' is an alkylene group containing 1 to 12 carbon atoms.

References Cited
UNITED STATES PATENTS

| | | | |
|---|---|---|---|
| 2,868,769 | 1/1959 | Graham | 260—78 L |
| 3,037,002 | 5/1962 | Pietrusza et al. | 260—78 L |

WILLIAM H. SHORT, Primary Examiner

L. M. PHYNES, Assistant Examiner

U.S. Cl. X.R.

260—78 A, 78 P